(No Model.)
G. H. HOWE.
APPARATUS FOR ADJUSTING HARVESTER REELS.
No. 288,811. Patented Nov. 20, 1883.
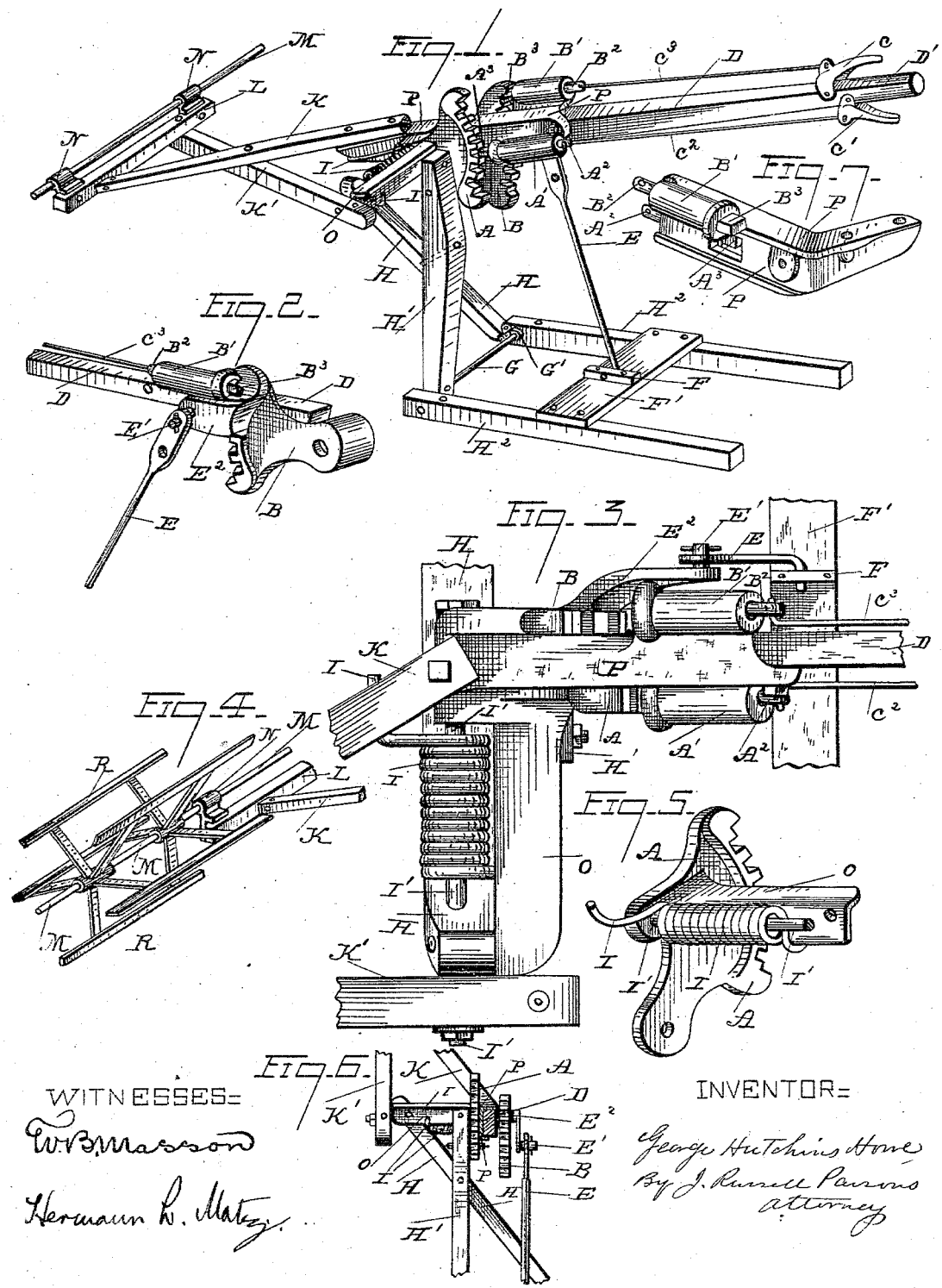
WITNESSES:
INVENTOR:
George Hutchins Howe
By J. Russell Parsons
attorney

UNITED STATES PATENT OFFICE.

GEORGE H. HOWE, OF HOOSIC FALLS, NEW YORK.

APPARATUS FOR ADJUSTING HARVESTER-REELS.

SPECIFICATION forming part of Letters Patent No. 288,811, dated November 20, 1883.

Application filed May 1, 1883. (No model.)

*To all whom it may concern:*

Be it known that I, GEORGE HUTCHINS HOWE, of the village of Hoosic Falls, county of Rensselaer, and State of New York, have invented certain new and useful Improvements in Apparatus for Adjusting Harvester-Reels, of which the following description, in connection with the accompanying drawings, constitutes a specification.

This invention relates to mechanism designed to be attached to harvesting or reaping machines for the purpose of enabling the operator, without stopping the machine or leaving his seat, to elevate or depress the grain-reel, within certain limits vertically, or to alter its position with reference to the cutter-bar by moving it horizontally in either a forward or backward direction, or to combine both of said adjustments, as the nature or condition of the crop or other exigencies of the case may require.

To enable others skilled in the art to construct and use my invention, I will proceed to describe the same with reference to the drawings, in which—

Figure 1 is a perspective view of the mechanism. Fig. 2 is a perspective view of a portion of the lever which is used to make the adjustments of the reel, together with a portion of its connection with the reel-support, taken from the side opposite the side shown in Fig. 1. Fig. 3 is a plan view, on an enlarged scale, of a portion of the lifting mechanism, a portion of the lever, holding-rods, and forward reel-supports being broken off. Figs. 4 and 5 are perspective views of details and their means of attachment to each other. Fig. 6 is a rear elevation of the mechanism, taken on a line just back of the main reel-supporting posts. Fig. 7 is a perspective view of the main casting, which connects the reel with the adjusting mechanism.

Similar letters of reference refer to the same parts in the several figures.

$H^2$ are bars of wood located in position to support the reel and mechanism for adjusting it, which may be varied, according to the circumstances of the case, to suit the requirements of the reaper or harvester to which they are attached; or they may be a part of the framework of the machine itself. The other portions of the machine are not shown in the drawings, they not forming any part of this invention; but the invention relates and may be adapted to any type of harvester or reaper where a reel is used, it being understood that the location of the mechanism shall be such as to bring the lever in easy and convenient reach of the operator of the machine. The bars $H^2$ are shown parallel to each other, and are connected at their forward ends by a rod, G, and at a proper distance in the rear by a plank or cross-piece, F'. This plank is furnished with a cleat or other projection, F, to which the lower end of the rod E is hinged. The lower end of the post H' is hinged at one end of the rod G and turns freely thereon, so it can vibrate in a vertical plane, or a plane perpendicular, or nearly so, to the horizontal plane of the bars $H^2$. The post H is hinged to the opposite end of the rod G, and extends upward and diagonally past the post H', and where these two posts H' and H cross each other they are bolted rigidly together. The lower end of the post H is provided with a casting, G', to form its hinge more perfectly. Thus the two pieces can turn freely on the rod G and form a strong and cheap support for the reel and the mechanism connected therewith.

To the top of the posts H and H' is rigidly fastened the casting O, which extends from one to the other and beyond the post H'. On the end of the casting O is cast the segmental rack A. This segment is bolted at the lower end of its flange to the post H'.

In front of the piece O is placed a shaft, I', which extends parallel with it and passes through a hole in the segment part A of the piece O at one end, and through a corresponding hole in the upper end of the post H at the other end. This shaft I' extends far enough at one end to sustain the casting P and the segment B, and at the other end to sustain the bar K', which forms one of the bars of the diagonally-braced frame, which supports the reel at its forward end. The casting P supports the bar K, which forms the other bar of the diagonally-braced frame aforesaid. This piece P is made angular in form, as shown in Fig. 7, for the purpose of supporting the bar K in an angular position in relation to the bar K', and its rear portion sustains the lever D, which is securely bolted to it. The segment B turns freely on the shaft I', and to it is hinged the rod E, which may be furnished with holes at its upper end to permit of adjustment. This rod E is hinged at its lower end to the cleat F, as hereinbefore described.

Upon the casting P is cast two barrels or hollow cylinders, B' and A', in each of which is placed a coiled spring, and through the coiled springs pass the bolts or pawls B² and A². The ends A³ B³ of these pawls are made of the right shape to enter the indentations of the respective segments B and A, and are each formed with a shoulder just in rear of its forward end, to abut against the end of the coiled spring in the barrel, the rear end of the spring abutting against a shoulder in the rear end of the barrel.

To the rear ends of the pawls are attached wire rods $c^3$ and $c^2$, which extend along the lever D to the pivoted hand-levers $c$ and $c'$, located above and below the handle of the lever D.

To the forward ends of the bars K and K', which cross each other and are bolted together at their point of crossing, is attached the bar L, which supports the reel-shaft M in proper bearings N, thus making a very strong frame with a small amount of material, composed of the two sets of cross-bars H H', (hinged at their lower ends to the frame of the machine,) and the cross-bars K and K' hinged to said frame H H' by the shaft I'.

Upon the shaft I' is placed a heavy coiled spring, I, one end of which is attached to the casting P, and the other end to the piece O. These attachments are made in this instance by extending the wire of which the spring is made under the two castings at its ends, as shown in Figs. 1, 3, and 5. By this arrangement the weight of the reel is counterbalanced, or partially so, and the sudden falling of the reel when the pawl A² is withdrawn from the indentations in segment A is prevented, and also the raising the reel, when desired, is assisted. When these pawls A² and B² are engaged in the indentations in their respective segments A and B the whole forms a rigid support.

If it is desired to raise or lower the reel, the operator takes hold of the handle of the lever D, and at the same time includes in the grasp of his hand the lever $c'$, which, through the intervention of the rod $c^2$, withdraws the pawl A² from the indentation in the segment A, and by raising or depressing the lever D the reel will be correspondingly lowered or raised as required. The lever $c'$ being released, the pawl is forced by the action of the coiled spring in the barrel A' into one of the indentations, and retains the reel at the desired height. The supports H and H' and the rod E being hinged, as described, the forward and backward movement of the reel due to its being moved in the arc of a circle of which the shaft I' is the center, will be compensated for and the upward and downward movement of the reel will be accomplished in a vertical line, or nearly so, so long as the pawl B² is left in the indentation in segment B. In case it is required to move the reel forward or backward the operator grasps the handle $c$ and withdraws the pawl B² from the indentation in segment B, and can then, by pushing forward or drawing backward the lever D, move the reel either forward or backward, the whole swinging on the rod G, and the hinge at the lower end of the rod E. In case it is required to make both movements of the reel at the same time—that is, forward or backward and upward or downward—both levers $c$ and $c'$ can be grasped, and the reel may thus be placed in any required position with reference to the finger-bar or platform of the machine. The segments A and B are each provided with one long tooth at each extremity of the series of indentations, to prevent their movement too far either way, and thus throw them out of connection.

Having thus fully described my invention, what I claim therein as new, and desire to secure by Letters Patent, is—

1. A reel-support for a harvester, composed of two parts or frames hinged together, each frame made of two bars crossing each other, the lower frame hinged at its lower end to the main frame of the machine, in combination with the connecting-rod hinged to the main frame in rear of the lower supporting-frame, substantially as described.

2. A reel-support composed of two parts hinged together, the lower part being hinged to the frame or some stationary part of the machine, in combination with two segmental racks mounted upon the same shaft, and the hand-lever provided with two pawls engaging with said racks, whereby the upward and downward and forward and backward movements of the reel can be made by means of a single lever, substantially as described.

3. The combination of the segments A and B, the lever D, the small levers $c$ and $c'$, the pawls A² and B², the connecting-rods, and the springs, substantially as described.

4. The combination of the frames H H' and K K', the rod I', which forms the hinge-connection between said frames, and the coiled spring I, substantially as and for the purpose described.

5. The combination of the upper and lower swinging supporting-frames, the rod by which they are hinged together, the segment A, rigidly fixed to the lower swinging frame, H H', the segment B, swinging freely on said hinge-rod, the lever D, and locking mechanism, substantially as described.

6. The combination of the swinging frame hinged to the frame or some stationary portion of the reaper, the segment A, mounted on the upper portion of said swinging frame, the segment B, turning freely on its axis, the connection hinged at its upper end to said segment B, and at its lower end to the frame or some other stationary part of the reaper, the lever D, and locking mechanism, substantially as described.

GEORGE HUTCHINS HOWE.

Witnesses:
DANFORTH GEER,
JNO. F. DINKEL.